(12) United States Patent
D'Elia et al.

(10) Patent No.: US 8,298,509 B2
(45) Date of Patent: Oct. 30, 2012

(54) ELECTRO-GASIFICATION PROCESS USING PRE-TREATED PET-COKE

(75) Inventors: Luis Felipe D'Elia, San Antonio de los Altos (VE); Alejandra López, San Antonio de los Altos (VE); Gladys Noguera, Caracas (VE)

(73) Assignee: Intevep, S.A., Caracas (VE)

( * ) Notice: Subject to any disclaimer, the term of this patent is extended or adjusted under 35 U.S.C. 154(b) by 363 days.

(21) Appl. No.: 12/122,766

(22) Filed: May 19, 2008

(65) Prior Publication Data

US 2009/0283447 A1    Nov. 19, 2009

(51) Int. Cl.
*C01B 3/24* (2006.01)
*C01B 3/38* (2006.01)

(52) U.S. Cl. .................. 423/650; 252/373

(58) Field of Classification Search .......... 423/650
See application file for complete search history.

(56) References Cited

U.S. PATENT DOCUMENTS

| 3,607,157 | A | * | 9/1971 | Schlinger et al. | 48/206 |
| 4,182,662 | A | * | 1/1980 | Hart | 205/637 |
| 4,608,137 | A | * | 8/1986 | Vaughan et al. | 205/637 |

* cited by examiner

*Primary Examiner* — Melvin C Mayes
*Assistant Examiner* — Kenneth Vaden
(74) *Attorney, Agent, or Firm* — Bachman & LaPointe, P.C.

(57) ABSTRACT

A method is provided for electro-gasification of pet-coke, including the steps of providing a pet-coke material; treating the pet-coke material to obtain a treated pet-coke material having an average particle size of between about 20 and about 106 μm; and exposing the treated pet-coke material to electro-gasification conditions to produce synthesis gas and/or hydrogen. Extraction of metals from the pet-coke is facilitated.

9 Claims, 9 Drawing Sheets

ELECTRO-GASIFICATION PROCESS USING PRE-TREATED PET-COKE

BACKGROUND OF THE INVENTION

Venezuela has calculated carboniferous reserves of more than 9,264 million metric tons. In addition, residues and coke are produced with the up-grading or refining of heavy oil. Basically, four qualities of coke exist: coke from petroleum combustion (pet-coke), regular coke, needle coke and recarburation coke.

The types of coke that are most valuable are recarburation cokes (used in steel industry) and needle cokes; whereas the least valuable is pet-coke since it has a low quality. Pet-coke is the one produced in greatest quantities worldwide, and is mainly used in thermal power stations and in the cement industry. Nevertheless, the demand for pet-coke from traditional consumers has decreased, therefore making it necessary to develop technology for non-conventional use/upgrading of pet-coke.

Gasification is an alternative for improvement of petroleum coke and mineral coal. The gasification of any organic material produces a synthesis gas, composed in its majority of carbon monoxide and hydrogen. Gasification technology has been available from the last century, mainly to process coal. The synthesis gas obtained by means of gasification can be used as raw material for production of alcohol, ammonia and synthetic liquid fuel. Also it can be used like fuel in a process for generation of electrical energy. The advantages to use coal as raw matter for production of synthesis gas or hydrogen are low cost, availability, and chemical stability. Nevertheless, gasification of coal has some disadvantages including high process temperature and pressure, consumption of oxygen, great amounts of toxic gas discharge and ash that requires the purification of products in separation units.

Recently, interest has resurged for a process that uses fuels such as coal or coke for synthesis gas and/or hydrogen generation and that does not require severe conditions of operation. An alternative process for the production of synthesis gas and/or hydrogen is a method for electro-gasification of pet-coke.

In the electro-gasification of pet-coke, two processes take place in parallel, namely, (i) synthesis gas and/or hydrogen production and (ii) recovery of metal from the carbon material. The advantage of this process is that the fraction of produced CO, $CO_2$ and $H_2$ can be changed with applied potential. Additionally, the gases produced in these reactions are pure and they do not require a later treatment. The electrochemical gasification according to the invention takes place at low temperatures, with a moderate potential with respect to electrolysis of the water and to atmospheric pressure, unlike the process of traditional gasification as used in refineries and that require temperatures above 800° C. and high pressures. An improved electro-gasification of pet-coke according to the invention has been shown to be an innovative process for the conversion of coke at low to moderate conditions of operation with impact potentials in: (i) reduction of coke volumes, (ii) generation of products of added value and (iii) recovery of metals. An important aspect of this technology is that the pet-coke slurries have low reaction rates due to some their properties such as low porosity and presence of some organic adsorbents. Therefore, a method is provided for pretreatment of the pet-coke to optimize size of particle and textural properties of pet-coke. Other objects and advantages will appear herein.

SUMMARY OF THE INVENTION

According to the invention, the foregoing objects and advantages have been readily attained.

According to the invention, a method is provided for electro-gasification of pet-coke, which comprises the steps of: providing a pet-coke material; treating the pet-coke material to obtain a treated pet-coke material having an average particle size of between about 20 and about 106 μm; and exposing the treated pet-coke material to electro-gasification conditions to produce syngas.

Other advantages of the present invention will appear herein below.

BRIEF DESCRIPTION OF THE DRAWINGS

A detailed description of preferred embodiments of the present invention follows, with reference to the attached drawings, wherein.

DETAILED DESCRIPTION

Figure 1:
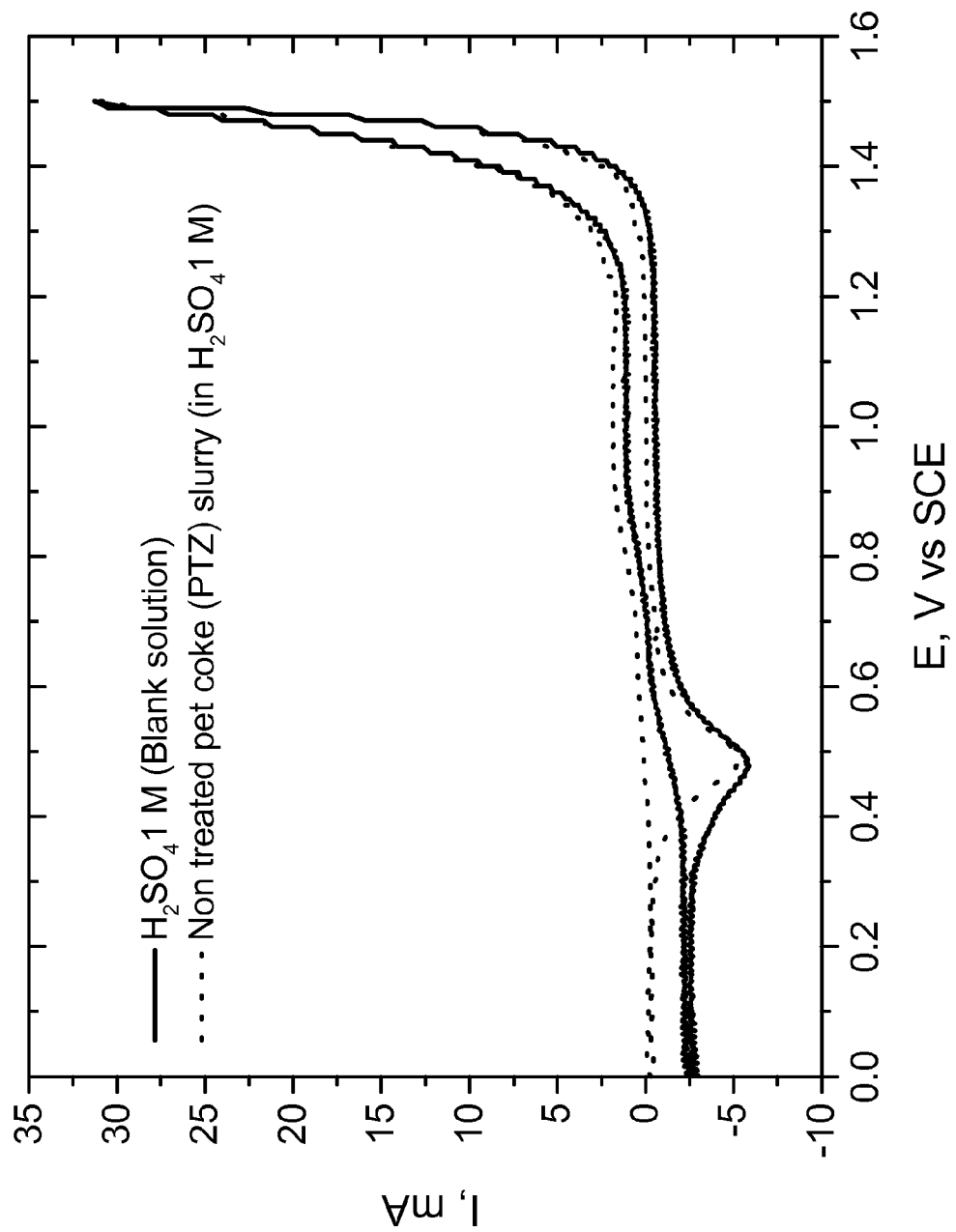
FIG. 1 shows cyclic voltammetry for slurries of petcoke (0.0855 g/ml; <106 μm) in $H_2SO_4$ (1 M), 50 mV·$s^{-1}$.

The invention relates to electro-gasification of pet-coke and, more particularly, to such a process which is made much more efficient under mild conditions and which also has added benefits with respect to extraction of metal from the carbonaceous matrix of the pet-coke.

Pet-coke is produced as a by product of many refining processes, and is very difficult to use and/or convert to useful products. Gasification processes have been used, but they require high temperature and pressure which add to cost and equipment needs of the process. Further, in some cases such processes tend to melt the metals contained in the pet-coke, and make removal of the so-melted metal more difficult.

Electro-gasification is known to operate at lower temperatures and pressures, but has not yet offered a suitable conversion level to make the process economical.

According to the present invention, a pre-treatment of the pet-coke is provided which increases electro-gasification efficiency, and which also facilitates easy removal of the metal contaminants for subsequent use, for example in catalyst production.

Starting material for the process of the present invention can be any of a wide variety of pet-coke materials, specific examples of which include Petrozuata (PTZ)pet-coke and Amuay Flexicoke. Compositions of typical pet-cokes are as shown in Table 1.

TABLE 1

Properties

| | Petrozuata |
|---|---|
| Micropore surface area (with $CO_2$) | 144.77 m²/g |
| Limiting micropore volume | 0.068 cm³/g |
| Composition (% wt) | Carbon (86.6-88.9) |
| | Hydrogen (4.2-4.7) |
| | Vanadium (0.20-0.22) |
| | Nickel (0.30-0.54) |
| | Iron (0.106) (variable) |
| | Sulfur (4.4-4.8) |
| | Ash (0.21-0.52) |
| Density | 600-961 (Kg/m³) |
| | Flexicoke (Amuay) |
| Micropore surface area (with $CO_2$) | 315.10 m²/g |
| Limiting micropore volume | 0.182 cm³/g |
| Composition (% wt/wt) | Vanadium (8.93) |
| | Nickel (0.6565) |
| | Iron (0.6356) (variable) |
| Density | |

According to the invention, it has been found that much greater conversion to syngas can be accomplished if the starting pet-coke material is pre-treated in a calcining and milling process wherein the final treated pet-coke product has a decreased average particle size, and an increased surface area with respect to the starting material.

According to the invention, the starting material can be calcined at a temperature of up to about 450° C., and preferably between about 250 and about 450° C. The calcining step can be carried out for an effective period of time, that is, a period of time effective to allow the subsequent milling step to produce the desired particle size, and for example a suitable calcining time can be a period between 2 and 10 hours, preferably 6 hours. The calcining step is believed to make the subsequent milling step more effective at producing small relatively uniform particle size pet-coke particles, using less milling energy. This step also removes organic adsorbates and increases the pet-coke porosity. Also, the calcining step is believed to free up metals in the pet-coke material to make such metals more removable and the carbonaceous material is more reactive. This in turn is believed to be due to the metals becoming unstable during transformation of the petcoke. After calcining and milling, during subsequent electro-gasification, such metals after pre-treatment according to the invention simply enter the electrolyte solution where they can be precipitated and recovered for separate use, for example in the production of catalysts.

Calcining can be carried out in any conventional equipment, at the temperatures and times set forth above.

Milling is carried out according to the invention to produce a treated pet-coke product having an average particle size of between 20 and 106 μm. A preferred average particle size is 53 μm, and preferably at least 80% of the particles are within 10 μm of this average particle size.

Milling can be carried out using any conventional equipment, and for times sufficient to produce the desired average particle size. Such particles have an increased reactivity during electro-gasification processes.

Following calcining and milling, the pet-coke is pre-treated according to the invention, and can be treated in an electro-gasification process to provide desirable results in synthesis gas and/or hydrogen production and metal extraction.

Electro-gasification can suitably be carried out in known reactors, for example having an electrode configuration having a metal cathode having a planar form, a corresponding anode in the form of a rectangular shaped perforated metal filled with carbon or suitably prepared coal or biomass particles. The perforated metal container may be titanium, or any other suitable metal known for this purpose.

The electrolyte medium could be an acid or basic aqueous electrolyte, $H_2SO_4$ or any other suitable electrolyte, preferably at a concentration of 1M. The applied potential during the process is preferably between about 1 and about 1.5 V. The working electrode can suitably be a platinum foil or any other material that favors electrochemical water decomposition and has a high $H_2/O_2$ evolution overpotential, such as Ti. The reaction temperature can be between about 25 and about 100° C., preferably about 40° C. The reactor is preferably stirred during the reaction.

Upon completion of the electro-gasification, syngas can be collected and stored and/or transported for future use. At the same time, suitable solution can be added to the electrolyte solution to cause dissolved metals to precipitate for collection and subsequent use as well.

It should be appreciated that the present invention provides the double benefit of producing syngas from pet-coke at much more friendly process conditions, and using simple and readily available equipment. Further, the process of the present invention at the same time helps extract the metals from the pet-coke for future use, which provides a potentially valuable by-product of the process, and also reduces any added costs for other attempts at retrieving such metals, as well as avoiding costs involved in the otherwise necessary disposal of spent process materials which still contain these metals.

Example

This experiment was conducted using electrochemical gasification of petrozuata (PTZ) pet-coke. The operating conditions for electrochemical gasification of this coke were:

Electrolytic medium: $H_2SO_4$ (1 M)
Potential applied: 1, 1.3 and 1.5 V
Working electrode: Platinum foil
Reference electrode: Saturated Calomel Electrode (SCE)
Reaction temperature: 40° C.
Electrolysis time: 250 s, 5 and 8 h
Size of pet-coke particles: <106 μm
Mechanical agitation: (190, 250, 350 and 460 rpm)
Feedstock: 400 ml of petrozuata pet-coke slurry (0.0855 g/ml) in $H_2SO_4$ Voltammograms were obtained for aqueous slurries of the petrozuata pet-coke (<106 μm, 0.0855 g/ml), at 50 mV·s$^{-1}$, with constant mechanical agitation (460 rpm), and the results are shown in FIG. 1.

Voltammograms obtained for petrozuata pet-coke slurry in original condition, without pre-treatment according to the invention, does not show significant variations with respect to the blank solution at potentials smaller than 1 V vs. SCE. The current rises sharply at 1 V vs. SCE as anodic potential increases. Slight variations in the cathodic sweeping are observed between the coal slurry and the blank solution. These differences can be attributed to a variation in the hydrogen adsorption on platinum originated by the adsorption of the coal on the platinum electrode.

Electrolysis of suspended petcoke slurry (0.0855 g/ml) in $H_2SO_4$ (1 M) was examined applying potentials of 1 and 1.3 V at 40° C. and under mechanical agitation. Results are shown in FIGS. 2 and 3.

Figure 2:
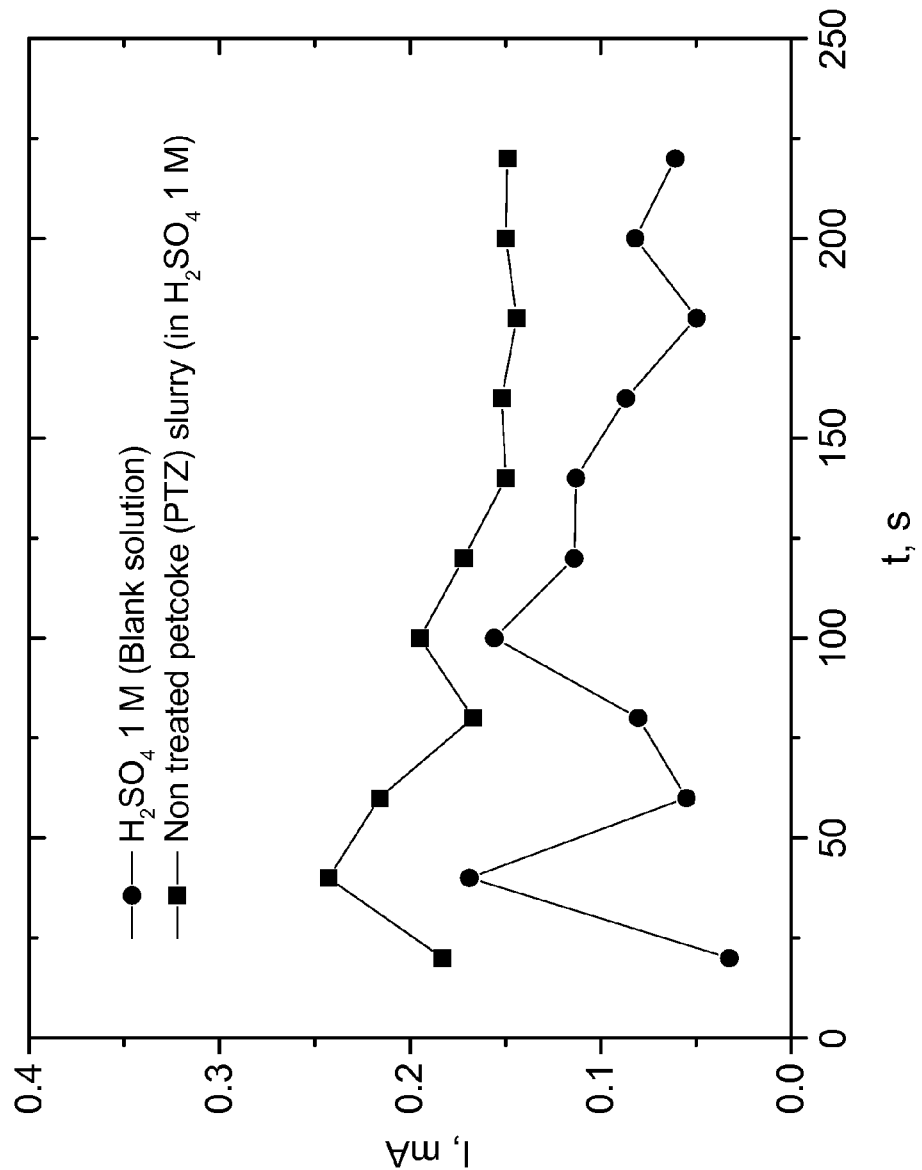
FIG. 2 shows anodic current versus time curve at 1 V vs. SCE cell voltage in pet coke slurries (0.0855 g/ml)
Figure 3:
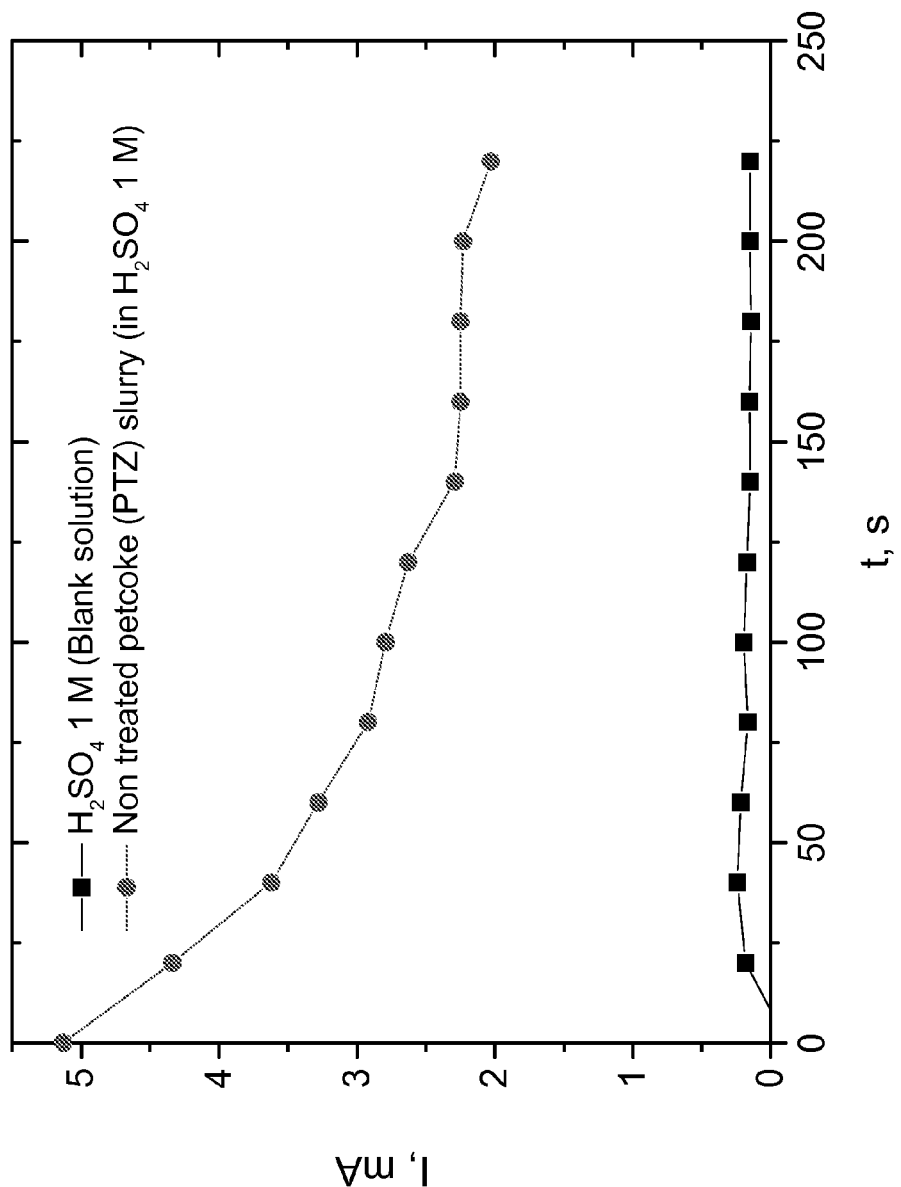
FIG. 3 shows anodic current versus time curve at 1.3 V vs. SCE cell voltage in pet coke slurries (0.6 g/ml)

In FIG. 2, the oxidation currents are plotted at 1 V cell voltage with mechanical agitation at 460 rpm. In these curves, it is possible to observe that the anodic current due to electrolysis of the petcoke is slightly higher than those of the blank solution. Again, at higher potentials (1.3 V), a noticeable increase in current was observed which resulted presumably from the onset of the petcoke oxidation (FIG. 3). Others have described electrolysis of suspensions of coal in acid. In these works, one indicates that the electrochemical response depends on the type of coal, purity, concentration, temperature, solvent and speed of agitation. The results of Example 1 indicate that it is necessary to carry out a pretreatment according to the invention, before electrolysis, in order to increase reactivity and kinetics of the reaction. In this sense it was decided to evaluate pet-coke (petrozuata) after carrying out a treatment as described herein.

In this experiment, pet-coke was pre-treated according to the invention. The pretreatment consisted of placing of pet-coke samples in a range of 250 to 450° C. for 6 h under air flow to remove organic adsorbates and increase the porosity. The resulting calcined material is milled and screened until the product obtained has a particle size majority of 53 μm (106-20 μm). Additionally, it was decided to evaluate the influence of coke concentration on the electrolysis of the coke slurry. This coke pretreatment has also been investigated using cyclic voltammetry.

Figure 4:
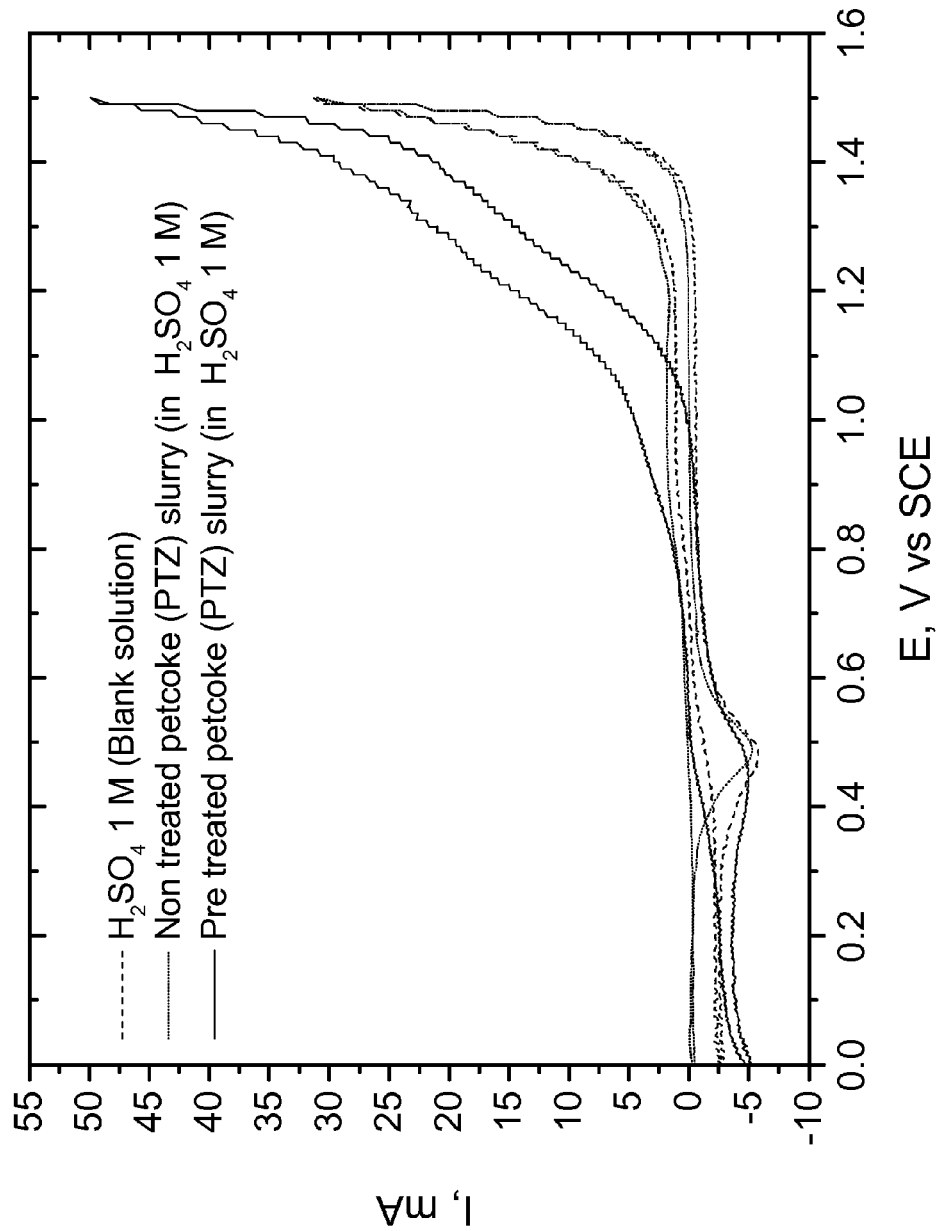
FIG. 4 shows cyclic voltammetry for slurries of pre-treated pet-coke (0.0855 g/ml; 106 μm) in $H_2SO_4$ (1 M), 50 mV·$s^{-1}$.

The voltammograms obtained for aqueous slurries (0.0855 g/ml) of pretreatment pet-coke PTZ (106 μm) in $H_2SO_4$ (1M) to 50 mV/s with mechanical agitation (420 rpm) and 40° C. is given in FIG. 4.

Figure 5:
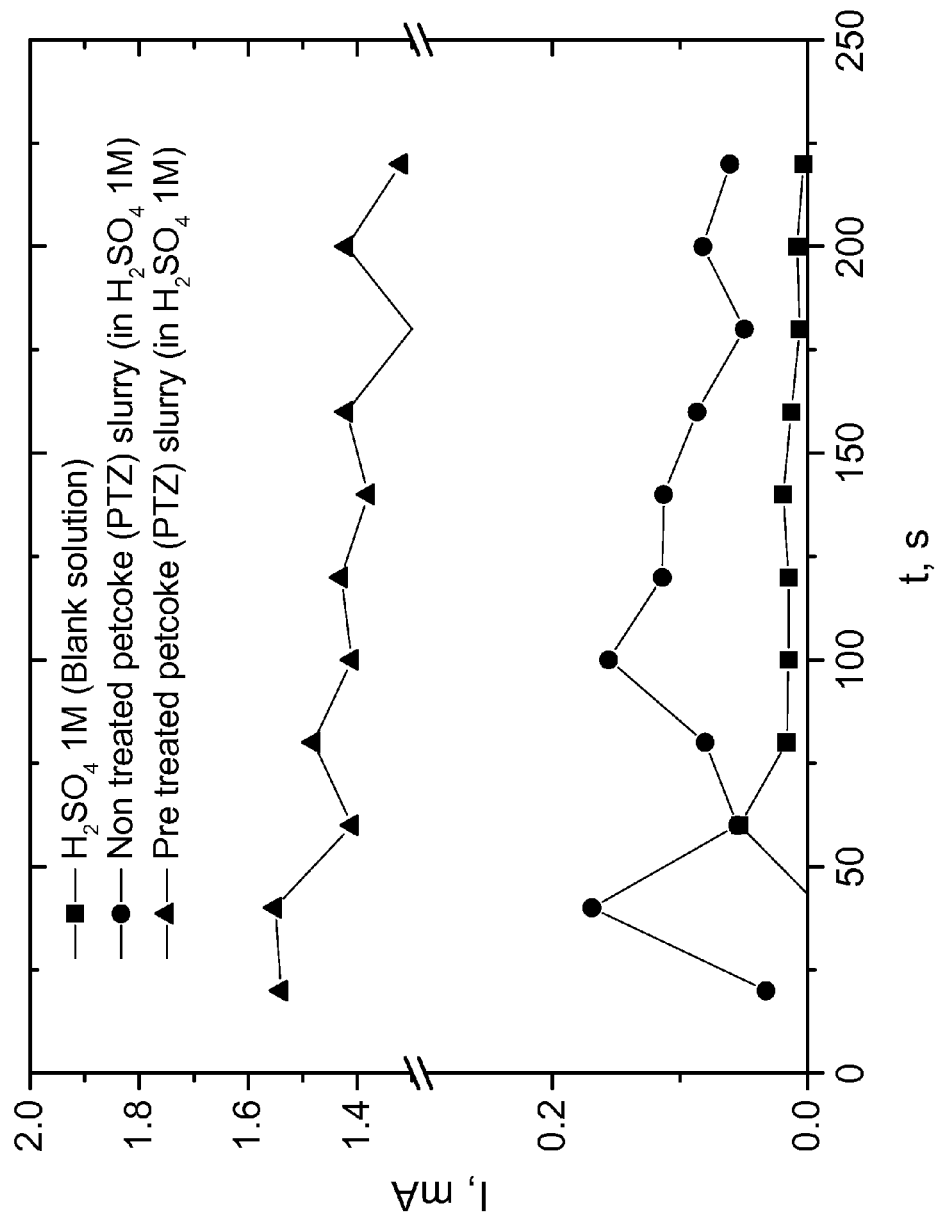
FIG. 5 shows potentiostatic electrolysis of pre-treated Petrozuata (PTZ) (0.0855 g/ml, 106 μm) to 1 V vs SCE.
Figure 6:
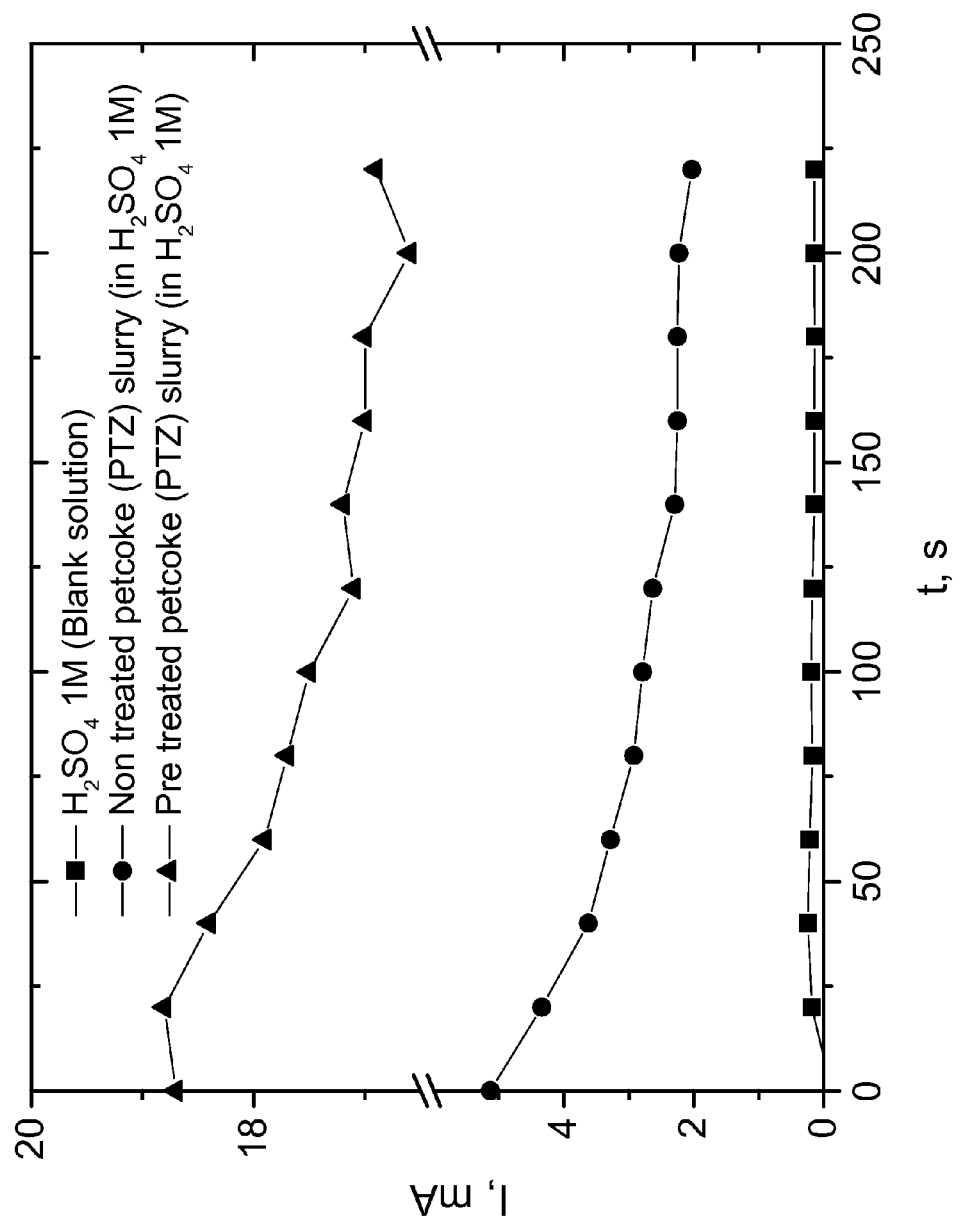
FIG. 6 shows potentiostatic electrolysis of pre-treated PTZ (0.0855 g/ml, 106 μm) to 1.3 V vs SCE.
Figure 7:
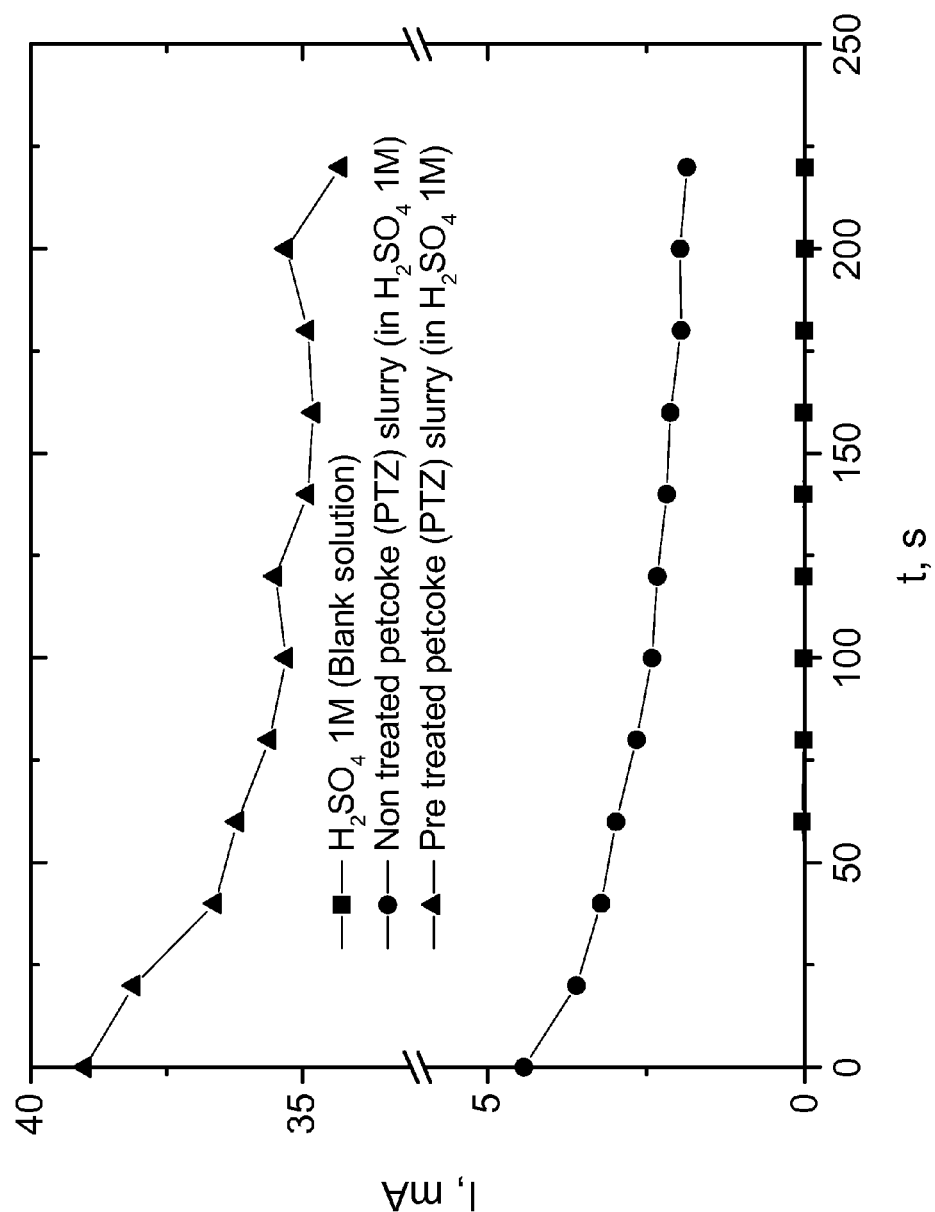
FIG. 7 shows potentiostatic electrolysis of pre-treated PTZ (0.0855 g/ml, 106 μm) to 1.5 V vs SCE.

The main feature of the electrochemistry response of pretreated pet-coke PTZ is a noticeable increase in anodic current starting at 0.6 V vs. SCE with respect to the original pet-coke. The potential window is limited until 1.5 V vs SCE to avoid the evolution of $O_2$. In these studies, potential differences of 1 to 1.5 V vs SCE were required for the onset of significant electrolysis current. In FIGS. 5, 6 and 7, electrolysis curves are shown for constant potentials of 1.0, 1.3 and 1.5 V vs SCE respectively to one speed of mechanical agitation 460 rpm.

Figure 8:
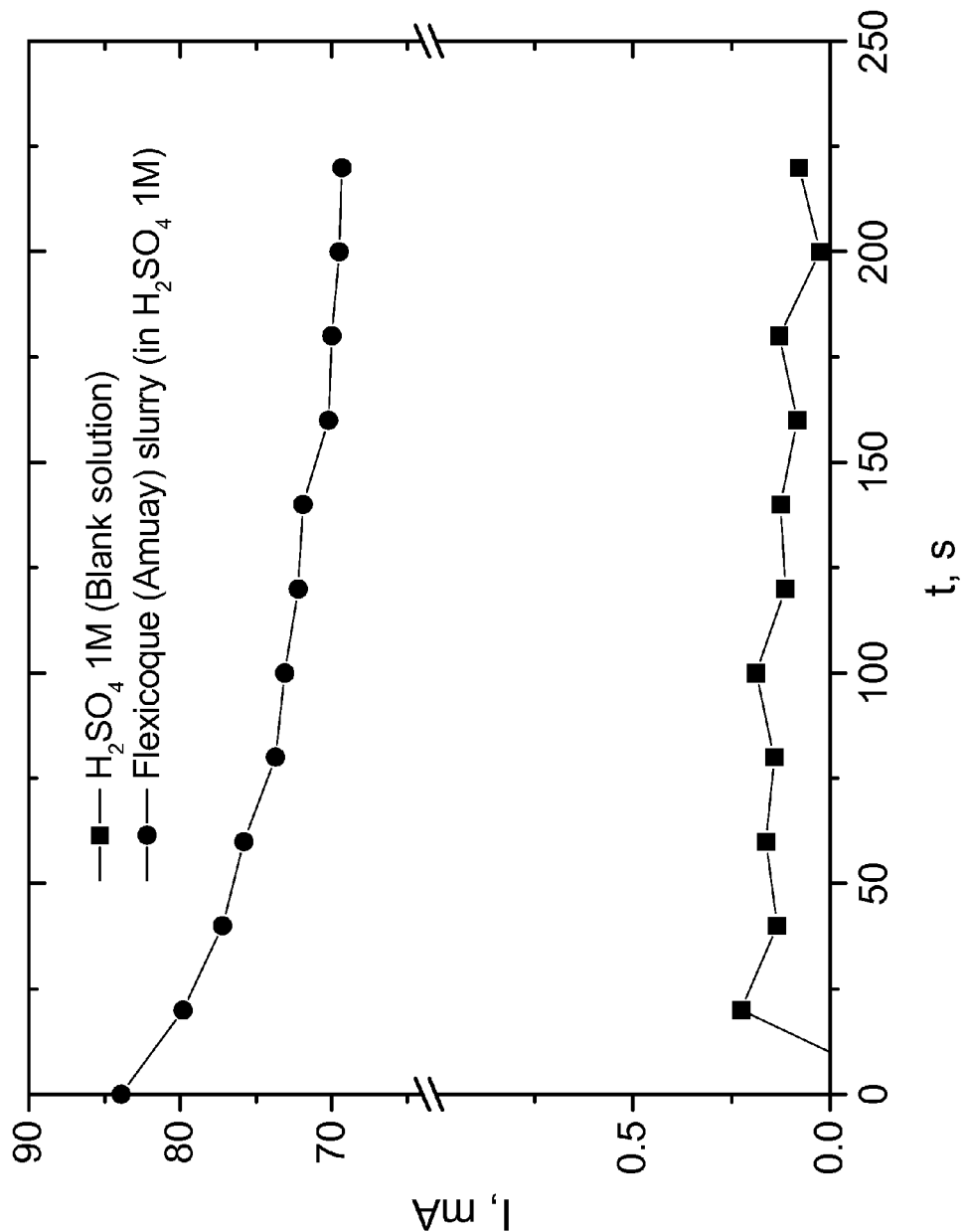
FIG. 8 shows potentiostatic electrolysis of flexicoke (Amuay) (0.0855 g/ml, 106 μm) to 1.3 V.
Figure 9:
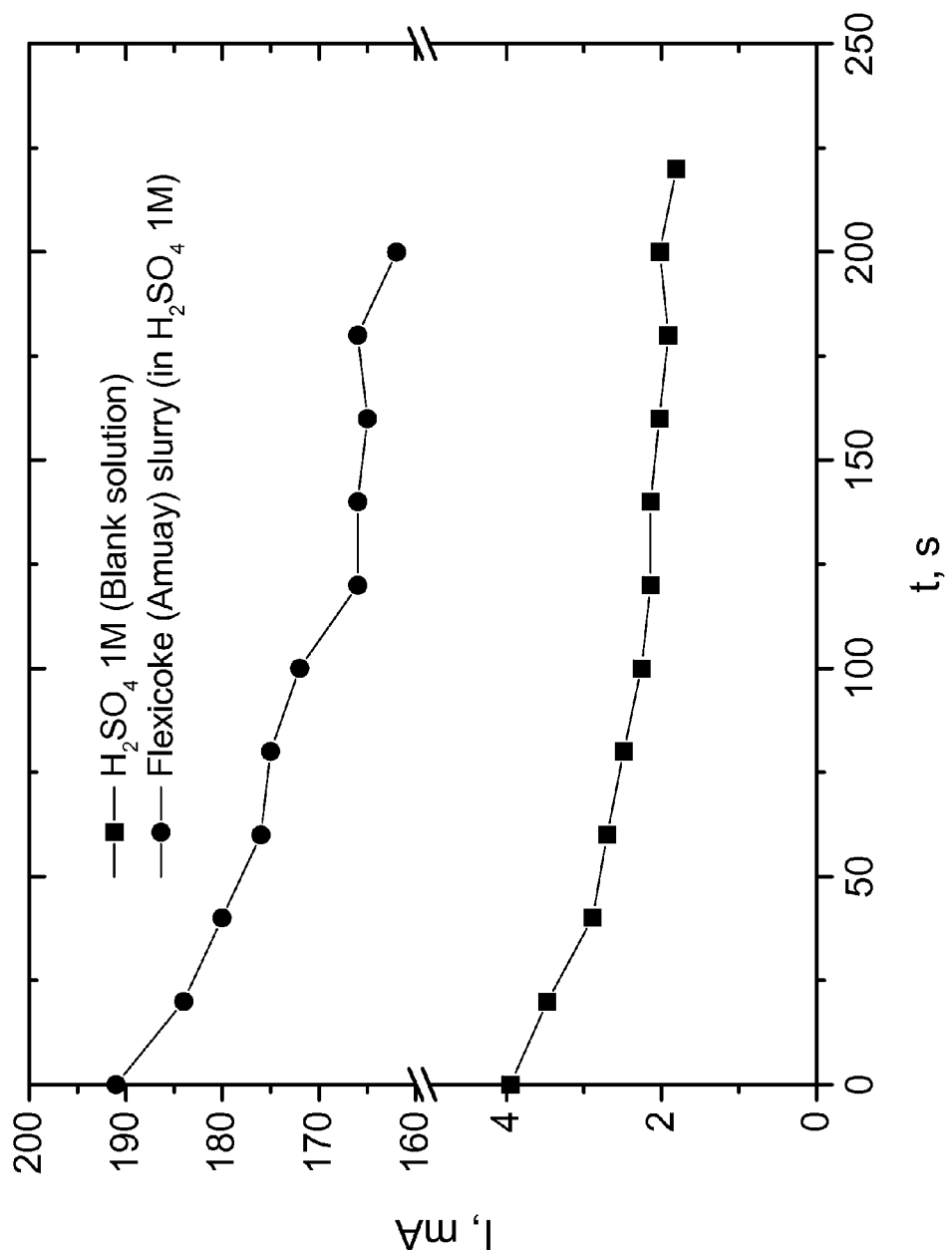
FIG. 9 shows potentiostatic electrolysis of flexicoke (Amuay) (0.0855 g/ml, 106 μm) to 1.5 V vs SCE.

In the curves of FIGS. 5-7, the pet-coke PTZ electro-gasification is favored and at higher potential a noticeable increase in anodic current was observed. This indicates that depending on the applied potential, the PTZ electro-gasification could be more or less favored. This observation agrees with previous results and demonstrates that textural properties of petcoke influenced their electrochemical response. A blank solution did not show a similar increase at higher potentials. Therefore, it is concluded that the present invention provides a simple but very efficient treatment to improve the transformation via electrochemical gasification of pet-coke. It should also be noted that the pretreatment of petcoke that consisted of calcination and later milling of the carbonaceous materials is an efficient methodology to increase its reactivity and therefore to improve the efficiency of the electrochemical gasification. Further the electro gasification was also evaluated as a parallel option for metal removing and syngas production. A pre-treated pet-coke slurry (0.25 g/ml, 106 μm) was electrolyzed by applying 1.3 V for 5 h. After the electrolysis, the blue solution was filtered and analyzed by ICP to determine the presence of metals. The analysis confirmed the metal content and therefore, also confirmed the possibility of producing syngas and also recovering metal. This experiment was also carried out using flexicoke, which is carbonaceous residue produced from heavy oil refining and has high metal content. A pre-treated flexicoke (Amuay) slurry was electrolyzed by applying 1.3 or 1.5 V at 460 rpm, FIGS. 8 and 9 evidence that the flexicoke is also electro gasified under both conditions.

The green filtered solution, after of electrolysis, is treated with a $K_3Fe(CN)_6$ solution. A brown solid is precipitated due to the formation of $KFe(CN)_6(VO_2)_2$. The solid was formed from the electrochemically extracted vanadium, in parallel with the electro-gasification of flexicoke and synthesis gas and/or hydrogen production.

Finally, in order to corroborate the $CO_2$ formation as a product of the gasification of the coke petrozuata, the gases produced during electrolysis for 8 hours were collected. For this purpose, the electrochemical cell was completely closed and gas outlet connected with a trap of a solution of a saturated solution of $Ba(OH)_2$-$8H_2O$ (0.05 M), which was connected as well to a trap with glycerin.

Electrolysis took place with a continuous flow of $N_2$, at 40° C., under magnetic agitation. After initiating electrolysis the formation of white precipitating in the trap of $Ba(OH)_2$ was observed. This confirmed the $CO_2$ loosening product of the electrochemical transformation of the petcoke with the consequent formation of precipitating of $BaCO_3$.

While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

The invention claimed is:

1. A method for electro-gasification of pet-coke, comprising the steps of:

providing a pet-coke material;

treating the pet-coke material to obtain a treated pet-coke material having an average particle size of between about 20 and about 106 μm, wherein the treating step comprises exposing the pet-coke material to a temperature of between about 250° C. and about 450° C. for a period of time effective to provide a thermally treated pet-coke, and then milling the thermally treated pet-coke to obtain the treated pet-coke, wherein the treated pet-coke material has increased porosity and reactivity as compared to starting pet-coke material; and exposing the treated pet-coke material to electro-gasification conditions to produce synthesis gas and/or hydrogen.

2. The method of claim 1, wherein the step of exposing the pet-coke material is carried out for a period of between 2 and 10 hours.

3. The method of claim 1, wherein the step of exposing the pet-coke material is carried out for at least 6 hours.

4. The method of claim 1, wherein the electro-gasification conditions include an electrolytic medium of $H_2SO_4$, applied potential between 0.6 and 1.5V, platinum foil working electrode having an area of 21.5 cm$^2$, a reaction temperature of 40° C., electrolysis time of at least about 250 s, and an average particle size of 53 μm.

5. The method of claim 1, wherein the pet-coke material contains metal, wherein the electro-gasification causes the metal to dissolve into the electrolyte solution, and further comprising the step of precipitating the metal from the electrolyte solution to recover the metal.

6. The method of claim 5, further comprising the step of using the recovered metal to make a catalyst for treatment of hydrocarbons.

7. The method of claim 5, wherein the recovered metal is selected from the group consisting of vanadium, nickel, iron and combinations thereof.

8. The method of claim 1, wherein the starting pet-coke material has an initial limiting micro pore volume of less than about 0.068 cm$^3$/g, and wherein the treated pet-coke material has an increased limiting micro pore volume which is greater than the initial limiting micro pore volume.

9. The method of claim 1, wherein the treated pet-coke material has an average particle size of 53 μm, with 80% of the particles having a particle size within 10 μm of 53 μm.

* * * * *